3,311,581
ADHESIVE COMPOSITION COMPRISING A POLYMER OF A CARBOXYLIC ACID ESTER, POLYVINYL ALCOHOL, AND AN AMINOPLAST
Andrew E. Pink, 15 Winsor Lane, Topsfield, Mass. 01983, now by change of name Andrew Earl Pierce
No Drawing. Filed June 22, 1964, Ser. No. 377,061
7 Claims. (Cl. 260—29.4)

This invention relates to an adhesive composition that is particularly useful in bonding cellulosic material of which sheets such as used in corrugated paper cartons are examples.

Corrugated board for this purpose is made to advantage with the incorporation of a thermosetting resin into the wood fiber sheet in order to reduce the tendency of the board to rehydrate and weaken on contact with water. There has been difficulty in making an adhesive for the joints in such cartons that will set quickly on application as a film, without the need of elevated temperatures for curing, and will then withstand long soaking in water without objectionable weakening of the adhesive bond.

The present invention provides an adhesive that is stable in aqueous solution, in which the curing agent becomes effective as the solution of it dries, even at ordinary temperature, and renders the film so resistant to water as to be irreversible therein.

Briefly stated, the invention comprises a combination of polyvinyl acetate or like vinyl ester, polyvinyl alcohol, an aminoplast such as a condensate of formaldehyde with urea and a catalyst of curing. The curing agent or catalyst is the combination of an amine salt of kind to be described and a salt of a strong acid with a metal whose hydroxide is either substantially neutral or a weak base, as illustrated by zinc nitrate.

A carton liner board with such an adhesive was aged for 16 hours at room temperature and then soaked in water for 24 hours. On being pulled apart, it showed separation by fiber tear rather than failure of the adhesive film.

The vinyl ester gives the "quick grab," that is, the desired wet adhesion, in advance of the more slow final curing or dry bonding of the adhesive film. While there is no need to depart from the economical polyvinyl acetate for this purpose, there may be used other vinyl polymers or copolymers of sufficient molecular weight so that the compounded adhesive when dried and subsequently soaked in water has a wet tensile strength that exceeds the strength of a substrate such as wet-strength, resin-treated kraft fiberboard. Examples of these polymeric materials are vinyl propionate or butyrate or any $C_1$–$C_8$ alkyl or alkenyl acrylate, methacrylate, maleate or citraconate or like esters of alpha unsaturated aliphatic acids containing not more than 6 carbon atoms to the molecule of the monomeric ester represented in the polymer.

I consider that the aldehyde condensation product such as urea formaldehyde resin ("UF") coacts with the polyvinyl alcohol in conjunction with the curing catalyst, to produce the crosslinking on which the ultimate water resistance of the adhesive film depends.

It is advantageous, in the preparation of this type of adhesives from polyvinyl acetate emulsions, to supplement the usual 88% hydrolyzed polyvinyl alcohol in those polyvinyl acetate emulsions stabilized with such 88% hydrolyzed polyvinyl alcohol. This supplementation preserves the primary emulsifying effect but reduces the tendency toward reemulsification of the dried film on soaking in water. For this effect, I heat the emulsion with more highly (e.g., 98%) hydrolyzed polyvinyl alcohol. This step, however, is not sufficient in itself to produce the required degree of water resistance in the adhesive film. There is required also a second step, namely, the addition of the UF resin plus catalyst.

The urea formaldehyde resin is made with proportions of materials and in manner that are conventional in making a resin which can be supplied in water solution or syrup form to the compounding operation, as with the proportions of 1 mole of urea to 1½–2 moles of formaldehyde. Suitable conditions for the condensation are an aqueous solution of the urea and formaldehyde at an initial pH of 7–8; a pH at refluxing temperature of 6–7, and 1–2 hours' refluxing. Melamine, guanidine, or dicyandiamide may be substituted for the urea, in making the aminoplast resin, in approximately the same equivalent proportions based on the number of nitrogen-containing groups per mole.

The polyvinyl alcohol used is any commercial grade of water soluble or dispersible type. An example is Lemol 60–98. This grade is 98% hydrolyzed, i.e., has approximately 2% of polyvinyl acetate remaining after the hydrolysis of the acetate from which the alcohol is made, and has a viscosity of 60–65 cps. as measured in a 4% aqueous solution at 20° C.

The complementary curing catalyst used is one containing a salt of an amine which does not rapidly liberate acid from the salt. The amine salt differs in this regard from the usual well known UF resin catalyst, such as ammonium chloride. With the amine salt catalyst of this invention, it is not necessary to defer its addition until just prior to the application of the adhesive; the mixture of adhesive and catalyst remains essentially stable in viscosity and adhesive characteristics for a period of up to three months when representative specimens are stored at room temperature or even at 105° F.

While not wishing to be bound by any particular theory or explanation of the reaction mechanism, I consider that the catalyst is nonreactive in the aqueous emulsion stage but, as the adhesive film loses its water, becomes reactive with the vinyl resin-polyvinyl alcohol-UF resin combination in manner, to develop free acid.

The amine salts that I can use are soluble in water and give therein a pH between 7 and that of ammonium chloride at the same concentration, e.g., mono-, di- and trialkyl and the corresponding alkanol amines and polyamine salts. Examples that illustrate the classes to be used are the salts of mono-, di- and triethanol amine, di- and tri-$C_1$–$C_4$ alkyl amines, the poly-$C_2$–$C_9$ alkyl dipropylene triamine, 2-methyl-2-amino-1-propanol, and 2-methyl-2-amino-1-butanol with the acids hydrochloric, hydrobromic, sulfuric, phosphoric, sulfamic, and benzene and other aryl sulfonic acids. Examples of the primary amines that may be combined with one of said acids and used in the salt form as catalyst are water soluble hydroxy amines, in which the amino group is attached to a tertiary carbon atom which is adjacent to at least one carbon atom to which a hydroxy group is attached, such as: 2-methyl-2-amino-1-propanol, or 2-ethyl-2-amino-1-butanol.

For best results the hydroxy amine salt is associated with a metallic salt that in water is acidic, the examples being zinc, copper, and magnesium nitrates, chlorides, sulphates, phosphates, and salts of other strong mineral acids.

The material of the classes described are mixed either in solution or water dispersion. Thus the urea formaldehyde or like resin may be supplied in the form of a syrup of concentration about 65% of total solids, the polyvinyl ester as an aqueous emulsion of about 55% solids, and polyvinyl alcohol and the acidic salt catalyst in dry, dispersed or dissolved condition, as may be most convenient.

There are used for some purposes a filler of which examples are fine china clay, diatomaceous earth powder, wood flour, pulverized Douglas fir bark, or other finely divided filler material that is chemically inert to the chemicals stated.

In one form of the invention the materials in aqueous dispersion, e.g., solution or suspension, are heated for 30 minutes at 140° F.–210° F. prior to or after the addition of all the ingredients. Thus it is permissible but not necessary to add the catalyst and urea formaldehyde resin after the cooking. The major component, the polyvinyl ester, should be present during the heating when partially hydrolyzed polyvinyl alcohol has been used as an emulsifier and protective colloid in the ester dispersion.

Subsequent to said heating, no further heating is needed for full effectiveness of the adhesive, after drying, as a strong, water-resistant, essentially nonredispersable adhesive film which provides a superior water-resistant bond on cellulosic products such as wet strength resin treated kraft corrugated paper cartons.

Experiments show that the development of water resistance in the adhesive is a two-step process. The heating step during which the polyvinyl ester is present causes intimate "association" of the additionally used fully hydrolyzed polyvinyl alcohol, such as sharing a previously combined component in the partially hydrolyzed ester (polyvinyl alcohol) ordinarily contained as an emulsifier and protective colloid in the polyvinyl acetate emulsion. In any case the association, whatever it may be, is sufficient in combination with the added UF resin and other components, to provide the required degree of water insensitivity in the dried film capable of giving good fiber-tearing bonds upon soaking in water. The following table shows proportions of ingredients of the several classe as permissible proportions and also those recommended for commercial use. Proportions here and elsewhere herein are expressed as parts by weight and on the dry basis unless specifically stated to the contrary.

| Components | Parts by Weight | |
|---|---|---|
| | Permissible | Recommended |
| Polyvinyl Alcohol | 0.5 to 15 | 2 to 8 |
| Aminoplast Resin | 0.2 to 3 | 0.8 to 1.5 |
| Polyvinyl Acetate | 15 to 50 | 28 to 40 |
| Amine Salt | 1 to 10 | 1.5 to 3 |
| Metal Salt | 1 to 10 | 1.5 to 3 |
| Filler | 4 to 10 | 4 to 7 |
| Water | Additional as required to make 100 parts total. | |

For most purposes the proportion of water to solid materials is so selected as to make the solids content about 20 to 65 parts for 100 parts of the adhesive dispersion. A high solids adhesive may show reduced penetration into the paper to be bonded as evidenced by the lack of a fiber-tearing bond rupture when wet after soaking in water. A low solids adhesive lacks the required quick-drying properties.

The invention is further illustrated by description in connection with the following specific examples of the practice of it.

*Example 1*

An adhesive composition was made by mixing together the following materials in proportions shown:

Components: Parts, dry wt.
Polyvinyl alcohol (Lemol 60–98) _____ 3
Urea formaldehyde condensate syrup (Casco Resin CR–5H) _____ 0.65
Polyvinyl acetate emulsion (Polyco 522) _____ 27.5
Hydrochloric acid salt of 2-methyl-2-amino-1-propanol _____ 3
Zinc nitrate _____ 3
Clay filler _____ 4
Additional water as required to make 100 parts.

The mixture was heated 30 minutes at 190°–200° F. during the compounding and immediately thereafter. In this formula, the urea formaldehyde syrup was a solution of 65% solids concentration, and the polyvinyl acetate emulsion contained 55% solids, the medium in each case being water.

In one adhesive specimen designated "A," all ingredients were heated together, while in specimen "B" the urea formaldehyde resin and catalyst were added to the other ingredients after the heating cycle had been completed and the mixture cooled. Both of the adhesive compositions were still mixed until substantially uniform.

The two adhesives, A and B, were tested with wet strength kraft sheet 60 lbs. base weight as follows: Plies of the wood fiber sheets with the adhesive therebetween were pressed together until drying had occurred. The composite so made was aged 72 hours at room temperature, soaked in water for periods of 3 and 24 hours, and evaluated in the usual manner by tearing apart strips 2 inches wide after the two different periods of soaking. For comparison only, like tests were made on a control sample which is no part of the invention and in which the adhesive composition used was:

Components of control— Parts (dry basis)
Clay filler _____ 4
Polyvinyl alcohol 98% hydrolyzed (Lemol 60–98) _____ 3
Polyvinyl acetate (Polyco 522) _____ 27.5
Urea formaldehyde condensate syrup (Casco Resin CR–5H) _____ 0.65
Water to make 100 parts.

| Treatment and Test | Specimen A | Specimen B | Control |
|---|---|---|---|
| 3 hours' soaking, tensile strength (lbs. per 2" wide laminant) | 1.31 | 1.25 | 0.55 |
| Fiber tear (percent of surface separated) | 50 | 50 | 0 |
| 24 hours' soaking, tensile strength (lbs. per 2" wide laminant) | 1.38 | 1.03 | 0.46 |
| Fiber tear (percent) | 80 | 60 | 0 |

The test for strength given above was made with the jaw separtion rate on the Scott tensile tester set at 12 inches per minute.

*Example 2*

The procedure and formula in Example 1 are used except that the 0.65 part of urea formaldehyde condensate is replaced by 0.65 part of a cationic urea formaldehyde condensate or, separately and in turn, by 0.65 part of each of the other aminoplast resins disclosed herein.

*Example 3*

Procedure and composition of Example 1 are followed except that the polyvinyl acetate used therein is replaced by an equal weight of each of the other polyvinyl esters or polyalkyl esters of alpha-unsaturated acids listed above, used separately and in turn.

*Example 4*

The procedure and composition of Example 1 are used except that the zinc nitrate is replaced by an equal weight of each of the other metal salts disclosed herein, used separately and in turn.

Adhesives made as described may be stored for at least three months before use. They have suitable viscosities for application by commercial methods, as by roll applicators of the type especially designed for us in applying glue to the side seam of corrugated boxes, i.e., viscosities for an aqueous composition of 40% solids at 25° C. of 500–2,500 cps. as measured by the Brookfield rotational viscometer No. 4 spindle at 20 r.p.m. The adhesive gives the desired bonding of paperboard or the like without the need of elevated temperature for curing and, when dried, gives the desired resistance to soaking in water as illustrated by the tensile and tear properties tabulated in Example 1.

I claim:

1. An adhesive comprising an aqueous dispersion of a polymer selected from the group consisting of polyvinyl acetate, propionate, butyrate and poly $C_1$–$C_8$ alkyl esters of alpha unsaturated aliphatic acids containing not more than 6 carbon atoms per molecule of the monomeric ester, polyvinyl alcohol, an aminoplast resin selected from a group consisting of urea formaldehyde, melamine formaldehyde, guanidine formaldehyde, and dicyandiamide formaldehyde, and an agent that in contact with said resin causes curing of the adhesive when in the dried film form, said agent being an amine salt in combination with a metal salt that in water is acidic, the proportion of said polymer being in the range of between about 15–50 parts, the proportion of said alcohol being in the range of between about .5–15 parts, the proportion of said aminoplast resin being in the range of between about .2–3 parts, the proportion of said amine salt being in the range of between 1–10 parts, the proportion of said metal salt being in the range between about 1–10 parts and the proportion of water being sufficient to make 100 parts total.

2. Adhesive of claim 1 said polymer being polyvinyl acetate.

3. The adhesive of claim 1 the aminoplast resin being urea formaldehyde condensate.

4. The adhesive of claim 1 said agent being an amine salt together with zinc nitrate.

5. The adhesive of claim 1 said agent being a salt of 2-amino-2-ethyl-1-propanol together with a metal salt that in water is acidic.

6. The adhesive of claim 4 said amine salt being a salt of 2-amino-2-methyl-1-butanol.

7. An adhesive comprising in parts by weight an aqueous dispersion of 15 to 50 parts of polyvinyl acetate, .2 to 3 parts of a urea formaldehyde condensate, .5–15 parts of polyvinyl alcohol, 1 to 10 parts of a propylamine hydrochloride, 1 to 10 parts of zinc nitrate, and water in amount to make the total solids content 20 to 65 parts for 100 parts of said dispersion.

References Cited by the Examiner

UNITED STATES PATENTS

| | | | |
|---|---|---|---|
| 2,755,198 | 7/1956 | Stewart | 260—29.4 |
| 2,773,050 | 12/1956 | Caldwell et al. | 260—29.4 |
| 2,846,337 | 8/1958 | Cooke et al. | 260—29.4 |
| 3,055,773 | 9/1962 | Mosher | 260—29.4 |

FOREIGN PATENTS 152,489  7/1953  Australia.

MURRAY TILLMAN, *Primary Examiner.*

J. C. BLEUTGE, *Assistant Examiner.*